(12) United States Patent  
Bickham et al.

(10) Patent No.: US 7,853,110 B2  
(45) Date of Patent: Dec. 14, 2010

(54) LARGE EFFECTIVE AREA OPTICAL FIBER

(75) Inventors: Scott Robertson Bickham, Corning, NY (US); Xin Chen, Corning, NY (US); Ming-Jun Li, Horseheads, NY (US); Snigdharaj Kumar Mishra, Wilmington, NC (US)

(73) Assignee: Corning Incorporated, Corning, NY (US)

( * ) Notice: Subject to any disclaimer, the term of this patent is extended or adjusted under 35 U.S.C. 154(b) by 77 days.

(21) Appl. No.: 12/256,573

(22) Filed: Oct. 23, 2008

(65) Prior Publication Data

US 2009/0148113 A1    Jun. 11, 2009

Related U.S. Application Data

(60) Provisional application No. 61/004,521, filed on Nov. 28, 2007.

(51) Int. Cl.  
    *G02B 6/36* (2006.01)
(52) U.S. Cl. ...................................................... 385/127
(58) Field of Classification Search .......... 385/123–127  
    See application file for complete search history.

(56) References Cited

U.S. PATENT DOCUMENTS 6,317,551 B1    11/2001    Mitchell et al. ............. 385/124

(Continued)

FOREIGN PATENT DOCUMENTS

EP          0721119         6/1995

(Continued)

OTHER PUBLICATIONS

"A new design for non-zero dispersion-shifted fiber (NZ-DSF) with a large effective area over 100 μm² and low bending and splice loss"; Yin et al' Optics Communications 177 (2000) 225-232.

(Continued)

*Primary Examiner*—Sarah Hahm  
(74) *Attorney, Agent, or Firm*—Svetlana Z. Short

(57) ABSTRACT

An optical fiber comprising: (i) a glass core (20) extending from a centerline and including a central core region (22) with an alpha value of less than 2, a first annular core region (24) surrounding the central core region (22), and a second annular core region (26) surrounding the first annular core region (24), wherein the second annular core region (26) has a higher maximum relative refractive index percent $\Delta_{26MAX}$ than that maximum relative refractive index percent $\Delta_{24MAX}$ of the first annular core region (24); and (ii) a glass cladding (30) surrounding and in contact with the core (20), the cladding comprising: (a) a first annular cladding region (32) extending from a radius $R_{C3}$ to a radius $R_{32}$, (b) a second annular cladding region (34) extending from the radius $R_{32}$ to a radius $R_{34}$, (c) a third annular cladding region (36) surrounding the second annular region (34) and extending from the radius $R_{34}$ to an outermost glass radius $R_{36}$; wherein the core (20) comprises a maximum relative refractive index percent $\Delta_{CMAX}$; wherein said first annular cladding region (32) comprises relative refractive index percent $\Delta_{32}(r)$ % the second annular cladding region (34) comprises a minimum relative refractive index percent, $\Delta_{34\ MIN}$, wherein $\Delta_{CMAX} > \Delta_{32MAX} > \Delta_{34MIN}$, and $\Delta_{34MIN} < -0.1$; and wherein the core and the cladding provide a fiber with cable cutoff less than 1500 nm, dispersion at 1550 nm 3 to 6 ps/nm/km, and an effective area at 1550 nm greater than 75 μm². The second annular cladding region may contain a plurality of randomly dispersed holes.

20 Claims, 3 Drawing Sheets

U.S. PATENT DOCUMENTS

| | | | |
|---|---|---|---|
| 6,477,305 B1 | 11/2002 | Berkey et al. | 385/123 |
| 6,904,772 B2 | 6/2005 | Berkey et al. | 65/412 |
| 7,106,934 B1 | 9/2006 | Mishra | 385/127 |
| 7,139,458 B2 | 11/2006 | Koh et al. | 385/127 |
| 7,203,407 B2 | 4/2007 | Berkey et al. | 385/123 |
| 7,313,312 B2 | 12/2007 | Kimball et al. | 385/142 |
| 7,603,015 B2 * | 10/2009 | Bickham et al. | 385/127 |
| 2002/0197039 A1 | 12/2002 | Carter et al. | 385/127 |
| 2004/0067034 A1 | 4/2004 | Rosenblum et al. | 385/127 |
| 2004/0105642 A1 | 6/2004 | Bickham | 385/127 |
| 2005/0094954 A1 | 5/2005 | Pickrell et al. | 385/123 |
| 2005/0111805 A1 | 5/2005 | Hertz et al. | 385/125 |
| 2006/0120678 A1 | 6/2006 | Manyam et al. | 385/125 |
| 2008/0304800 A1 * | 12/2008 | Bickham et al. | 385/127 |

FOREIGN PATENT DOCUMENTS

| | | |
|---|---|---|
| EP | 1564569 | 2/2004 |
| WO | 00/19255 | 4/2000 |
| WO | 01/11402 | 2/2001 |
| WO | 01/38911 | 5/2001 |
| WO | 01/47822 | 7/2001 |
| WO | 2007/055881 | 5/2007 |

OTHER PUBLICATIONS

Single-Mode Fiber Optics; Luc B. Jeunhomme, Principles and Applications—Second Edition, Revised and Expanded; Photonetics; Marly le Roi. France; pp. 39-44.

* cited by examiner

LARGE EFFECTIVE AREA OPTICAL FIBER

This application claims the benefit of U.S. Provisional Application Ser. No. 61/004,521, filed Nov. 28, 2007, entitled "Large Effective Area Optical Fiber."

BACKGROUND OF THE INVENTION

1. Field of the Invention

Optical fibers such as non-zero dispersion fibers (NZDF) with dispersion below 6 ps/nm/km at a wavelength of 1550 nm are suitable for dense wavelength division multiplexing (DWDM). These fibers typically have a central core, with a central inner core region and a positive refractive index annular ring. The core sometimes includes at least one depressed index region adjacent to and in contact with the ring. The core is a fiber region containing at least 90% of signal light. These NZDFs typically provide 3 to 6 ps/nm/km of dispersion at 1550 nm, and have an effective area of less than 75 $\mu m^2$ at 1550 nm.

2. Technical Background

Optical fibers utilized in so-called "dense wavelength division multiplexing conditions" can be subjected to a variety of bending environments, in a manner which induces bend losses in optical signals transmitted through the optical fiber. Some applications that can impose physical demands, such as tight bend radii, compression of optical fiber, etc., that induce bend losses include the deployment of optical fiber in optical underground cable assemblies, buckling induced by large temperature variations, and small bend radius multiports located in cabinets that connect feeder and distribution cables. Optical fibers, such as conventional NZDF fibers, exhibit a relatively large bend losses when bend to a small radius of curvature (for example, 5 dB/m to 6 dB/m when bend around 15 mm radius).

SUMMARY OF THE INVENTION

One aspect of the present invention relates to an optical fiber which comprises:

(i) a glass core (20) extending from a centerline and including a core region (22) with an alpha value of less than 2 and comprising a maximum relative refractive index percent, $\Delta_{CMAX}$, the central core region (22) having volume $V_{22}$; a first annular core region (24) surrounding the central core region (22); and a second annular core region (26) surrounding the first annular core region (24) having volume $V_{26}$, wherein the second annular core region (26) has a higher maximum relative refractive index percent $\Delta_{26MAX}$ than the maximum relative refractive index percent $\Delta_{24MAX}$ of the first annular core region (24); and (ii) a glass cladding (30) surrounding and in contact with the core, the cladding comprising: a first annular cladding region (32) extending from a radius $R_{C3}$ to a radius $R_{32}$, wherein $R_{32}$ and comprising relative refractive index percent $\Delta_{32}(r)$ %, a maximum relative refractive index percent, $\Delta_{32\,MAX}$ and a minimum relative refractive index percent, $\Delta_{32}$ MIN; a second annular cladding region (34) extending from the radius $R_{32}$ to a radius $R_{34}$ and comprising relative refractive index percent $\Delta_{34}(r)$ % and a minimum relative refractive index percent, $\Delta_{34\,MIN}$; a third annular cladding region (36) surrounding the second annular region (34) and extending from the radius $R_{34}$ to an outermost glass radius $R_{36}$;

wherein $\Delta_{CMAX} > \Delta_{26MAX} > \Delta_{32MAX}$; $\Delta_{32MIN} > \Delta_{34MIN}$, and $\Delta_{34MIN} < -0.1$; and the core and the cladding provide a fiber with cable cutoff less than 1500 nm, dispersion D at 1550 nm of $3 \leq D \leq 8$ ps/nm/km, and an effective area at 1550 nm greater than 80 $\mu m^2$. The second annular cladding region may contain a plurality of randomly dispersed holes. These fibers preferably have bend losses of less 5 dB/m, even more preferably less than 2 dB/m, more preferably less than 1 dB/m, and most preferably less than 0.5 dB/m, at 1550 nm, when the fiber is wrapped around a mandrel having 15 mm radius. Preferably volume $V_{26} < 4.5\%$ $\mu m^2$ and the sum of the values $V_{22}+V_{26}$ is less than 6.5% $\mu m^2$.

In one set of embodiments, the second annular region comprises silica glass having a dopant selected from the group consisting of germanium, aluminum, phosphorus, titanium, boron, and fluorine.

In another set of embodiments, the second annular region comprises silica glass with a plurality of closed randomly distributed holes, the holes being either empty (vacuum) or gas filled, wherein the holes provide internal reflection of light, thereby providing wave guiding to light traveling along the core. Such holes can provide an effective refractive index which is low, e.g. compared to pure silica.

According to one set of embodiments the optical fiber comprises:

(i) a glass core (20) extending from a centerline and including a central core region (22) with an alpha value of less than 2, said central core region(22) has volume $V_{22} < 2\%$ $\mu m^2$, and an outer radius $Rc_1$ and 2.5 $\mu m \leq Rc_1 < 4$ $\mu m$; a first annular core region (24) surrounding the central core region (22), and a second annular core region (26) surrounding the first annular core region (24), wherein the second annular core region (26) has a higher maximum relative refractive index percent $\Delta_{26MAX}$ than that maximum relative refractive index percent $\Delta_{24MAX}$ of the first annular core region (24), said second annular core region has width $W_{26} < 4.2$ $\mu m$; and (ii) a glass cladding (30) surrounding and in contact with the core, the cladding comprising:

a first annular cladding region (32) extending from $R_{C3}$ to a radius $R_{32}$, wherein $R_{32} \geq 15$ $\mu m$;

a second annular cladding region (34) extending from the radius $R_{32}$ to a radius $R_{34}$ and having minimum relative refractive index percent, $\Delta_{34\,MIN}$, the second annular cladding region comprises silica based glass with at least 50 closed randomly dispersed holes situated therein, and (i) mean distance between the holes is less than 5000 nm, and (ii) at least 80% of the holes have a maximum cross-sectional dimension Di of less than 1500 nm; and a third annular cladding region (36) surrounding the second annular region (34) and extending from the radius $R_{34}$ to an outermost glass radius $R_{36}$;

wherein the core (20) comprises a maximum relative refractive index percent, $\Delta_{CMAX}$; wherein said first annular cladding region (32) comprises relative refractive index percent $\Delta_{32}(r)$ %, a maximum relative refractive index percent, $\Delta_{32\,MAX}$, and a minimum relative refractive index percent, $\Delta_{32\,MIN}$;

wherein $\Delta_{CMAX} > \Delta_{26MAX} > \Delta_{32MAX}$; $\Delta_{32\,MIN} > \Delta_{34MIN}$, and $\Delta_{34MIN} < -0.1$. Preferably the core and the cladding provide a fiber with cable cutoff less than 1500 nm, dispersion D at 1550 nm of $3 \leq D \leq 8$ ps/nm/km, an effective area at 1550 nm greater than 80 $\mu m^2$; dispersion slope less than 0.12 ps/nm2/km, kappa less than 80 nm at 1550 nm, and bend losses less 5 dB/m when the fiber is wrapped around a mandrel having 15 mm radius.

DETAILED DESCRIPTION OF THE PREFERRED EMBODIMENT

Figure 1:
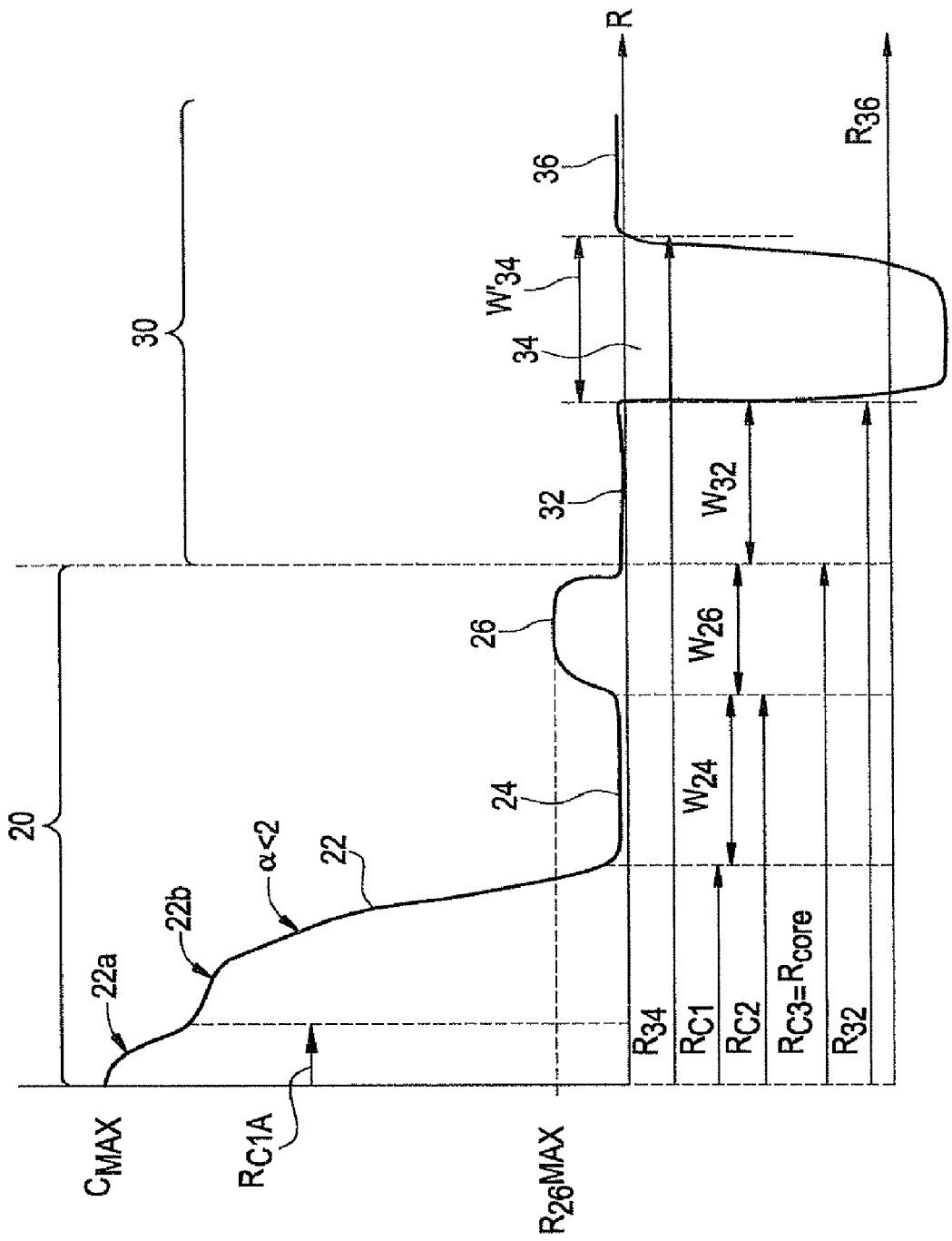
FIG. 1 shows a relative refractive index profile of an embodiment of an optical waveguide fiber as disclosed herein.

Additional features and advantages of the invention will be set forth in the detailed description which follows and will be apparent to those skilled in the art from the description or recognized by practicing the invention as described in the following description together with the claims and appended drawings.

The "refractive index profile" is the relationship between refractive index or relative refractive index and waveguide fiber radius.

The "relative refractive index percent" (also referred herein as "refractive index delta" or "index delta") is defined as $\Delta \% = 100 \times (n_i^2 - n_c^2)/2n_i^2$, where $n_i$ is the refractive index in region i, unless otherwise specified, and $n_c$ is the average refractive index of the third annular region 36 (outer region) of the cladding. As used herein, the relative refractive index is represented by $\Delta$ and its values are given in units of "%", unless otherwise specified. The relative refractive index is at a wavelength of 1550 nm unless otherwise specified. In cases where the refractive index of a region is less than the average refractive index of the outer annular region, the relative index percent is negative and is referred to as having a depressed region or depressed index, and the minimum relative refractive index is calculated at the point at which the relative index is most negative unless otherwise specified. In cases where the refractive index of a region is greater than the average refractive index of the cladding region, the relative index percent is positive and the region can be said to be raised or to have a positive index. An "updopant" is herein considered to be a dopant which has a propensity to raise the refractive index relative to pure undoped $SiO_2$. A "downdopant" is herein considered to be a dopant which has a propensity to lower the refractive index relative to pure undoped $SiO_2$. An updopant may be present in a region of an optical fiber having a negative relative refractive index when accompanied by one or more other dopants which are not updopants. Likewise, one or more other dopants which are not updopants may be present in a region of an optical fiber having a positive relative refractive index. A downdopant may be present in a region of an optical fiber having a positive relative refractive index when accompanied by one or more other dopants which are not downdopants. Likewise, one or more other dopants which are not downdopants may be present in a region of an optical fiber having a negative relative refractive index.

"Chromatic dispersion", herein referred to as "dispersion" unless otherwise noted, of a waveguide fiber is the sum of the material dispersion, the waveguide dispersion, and the inter-modal dispersion. In the case of single mode waveguide fibers the inter-modal dispersion is zero. Dispersion slope is the rate of change of dispersion with respect to wavelength.

"Effective area" is defined as:

$$A_{eff} = 2\pi (\int f^2 r \, dr)^2 / (\int f^4 r \, dr),$$

where the integration limits are 0 to $\infty$, and f is the transverse component of the electric field associated with light propagated in the waveguide. As used herein, "effective area" or "$A_{eff}$" refers to optical effective area at a wavelength of 1550 nm unless otherwise noted.

The term "$\alpha$-profile" or "alpha profile" refers to a relative refractive index profile, expressed in terms of $\Delta(r)$ which is in units of "%", where r is radius, which follows the equation, $$\Delta(r) = \Delta(r_o)(1 - [|r - r_o|/(r_1 - r_o)]^\alpha),$$

where $r_o$ is the point at which $\Delta(r)$ is maximum, $r_1$ is the point at which $\Delta(r)$ % is zero, and r is in the range $r_i \leq r \leq r_f$, where $\Delta$ is defined above, $r_i$ is the initial point of the $\alpha$-profile, $r_f$ is the final point of the $\alpha$-profile, and $\alpha$ is an exponent which is a real number.

The mode field diameter (MFD) is measured using the Peterman II method wherein, $2w = MFD$, and $w^2 = (2 \int f^2 r \, dr / \int [df/dr]^2 r \, dr)$, the integral limits being 0 to $\infty$.

The bend resistance of a waveguide fiber can be gauged by induced attenuation under prescribed test conditions.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

The cabled cutoff wavelength, or "cabled cutoff" is even lower than the measured fiber cutoff due to higher levels of bending and mechanical pressure in the cable environment. The actual cabled condition can be approximated by the cabled cutoff test described in the EIA-445 Fiber Optic Test Procedures, which are part of the EIA-TIA Fiber Optics Standards, that is, the Electronics Industry Alliance—Telecommunications Industry Association Fiber Optics Standards, more commonly known as FOTP's. Cabled cutoff measurement is described in EIA-455-170 Cable Cutoff Wavelength of Single-mode Fiber by Transmitted Power, or "FOTP-170".

Unless otherwise noted herein, optical properties (such as dispersion, dispersion slope, etc.) are reported for the LP01 mode. Unless otherwise noted herein, a wavelength of 1550 nm is the reference wavelength.

Various wavelength bands, or operating wavelength ranges, or wavelength windows, can be defined as follows: "1310 nm band" is 1260 to 1360 nm; "E-band" is 1360 to 1460 nm; "S-band" is 1460 to 1530 nm; "C-band" is 1530 to 1565 nm; "L-band" is 1565 to 1625 nm; and "U-band" is 1625 to 1675 nm.

The optical fiber 10 disclosed herein comprises a core 20 and a cladding layer (or cladding) 30 surrounding and directly adjacent the core. The core 20 has a refractive index profile, $\Delta_{CORE}(r)$. The cladding 30 has a refractive index profile, $\Delta_{CLAD}(r)$. Both the core 20 and the cladding 30 comprise a plurality of regions. Preferably, at least one cladding region includes a plurality of voids (also referred to as holes herein).

These voids may be filled with gases such as, for example, air, or Nitrogen, Argon, Krypton, or combinations thereof.

In some embodiments, the core comprises silica doped with germanium, i.e. germania doped silica. Dopants other than germanium, singly or in combination, may be employed within the core, and particularly at or near the centerline, of the optical fiber disclosed herein to obtain the desired refractive index and density.

Figure 2:
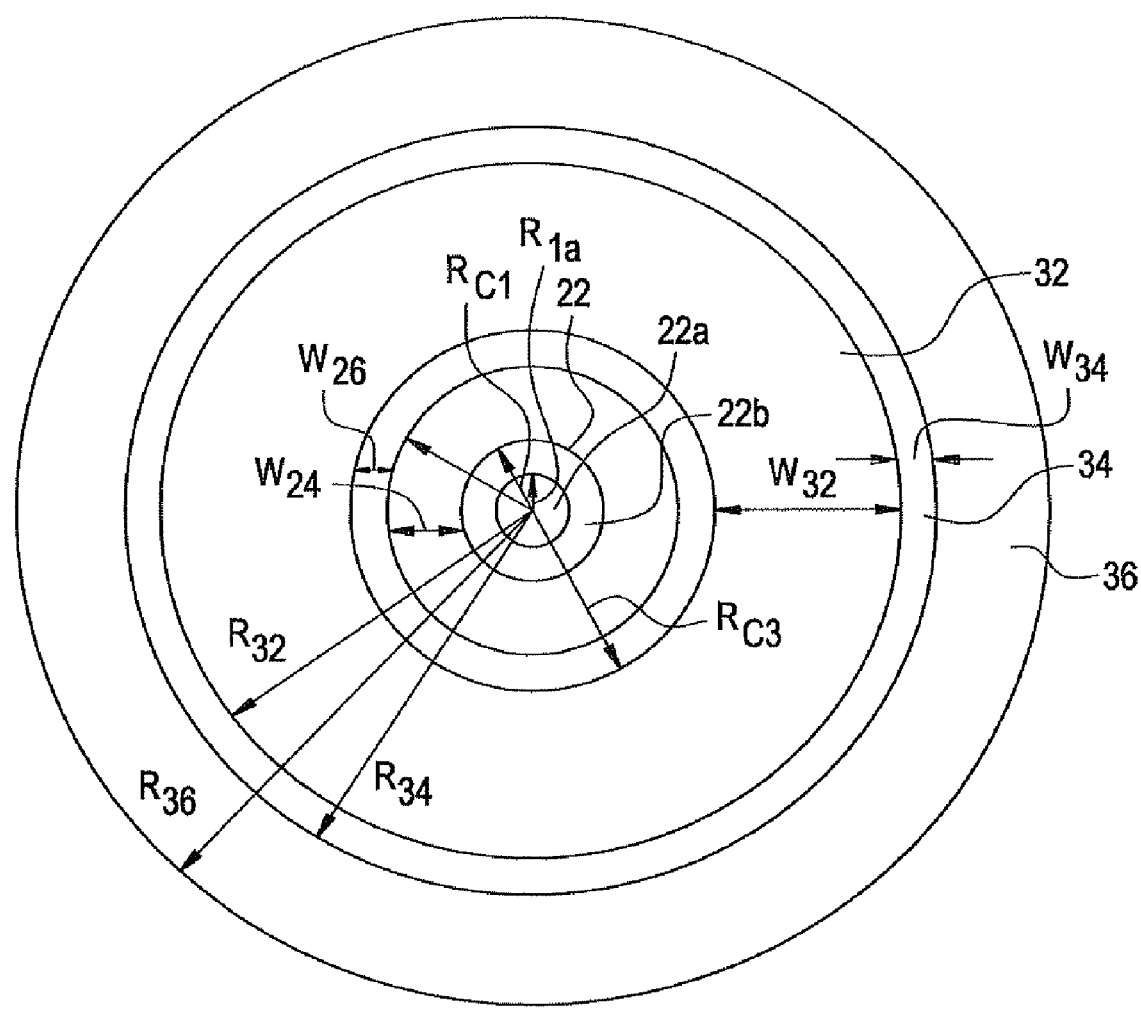
FIG. 2 is a schematic cross-sectional view of an embodiment of an optical waveguide fiber as disclosed herein.

Referring to FIGS. 1 and 2, optical waveguide fibers 10 disclosed herein comprise: a core 20 extending radially outwardly from the centerline to an outer radius, $R_{CORE}$, and having a relative refractive index profile, $\Delta_{CORE}(r)$ in %, with a maximum relative refractive index percent, $\Delta_{CMAX}$ and a cladding 30 surrounding and directly adjacent, i.e. in direct contact with, the core 20. Cladding 30 may be optionally be surrounded by one or more polymer coatings. The core 20 comprises: a central region 22 characterized by an outer radius $Rc_1$, a first annular core region 24 surrounding the central region 22 and directly adjacent thereto, extending radially outwardly to a second annular core region 26, and characterized by an outer radius $Rc_2$. Preferably 2.5 µm≤$Rc_1$≤4.0 µm; 3.5 µm≤$Rc_2$≤6.5 µm; 7 µm≤$Rc_3$≤10.5 µm. Most preferably, 2.8 µm≤$Rc_1$≤3.8 and 0.6≤$\Delta_{CMAX}$≤0.85. Preferably $Rc_3$≤10.5 µm; more preferably $Rc_3$≤10 µm. At least a portion of the central core region 22 has a refractive index profile with alpha profile value α of less than 2. The second annular core region 26 is characterized by an outer radius $Rc_3$, wherein $Rc_3$=$R_{CORE}$. Preferably, $Rc_1$<5.0 µm, more preferably more preferably 1.6 µm<$Rc_1$<4.0 µm, even more preferably 2.7 µm<$Rc_1$<4.0 µm, and in some embodiments 2.7 µm<$Rc_1$<3.5 µm. Preferably, $R_{C2}$>4 µm, more preferably >5 µm, and in some embodiments 6 µm>$Rc_2$>4 µm. Preferably, $R_{C3}$>7.0 µm, more preferably more preferably 7 µm<$R_{C3}$<10.5 µm, and even more preferably 7.5 µm<$R_{C3}$<10 µm.

The central core region 22 may include a center line region 22a having an outer radius $R_{C1_a}$ and a region 22b with an alpha profile α and an outer radius $Rc_1$ surrounding the center line region 22a. The core region 22 has maximum relative refractive index percent, $\Delta_{CMAX}$. In the fiber embodiments listed in Table 1, the center line region 22a corresponds to $\Delta_{CMAX}$ and region 22a has a slightly smaller refractive index delta with maximum delta $\Delta_{22bMAX}$. The first annular core region 24 has a width $W_{24}$ and midpoint radius $R_{24MID}$, and a relative refractive index profile, $\Delta_{24}(r)$ in %, with a maximum relative refractive index percent, $\Delta_{24\ MAX}$, in %, a minimum relative refractive index percent, $\Delta_{24\ MIN}$. The second annular core region 26 has a width $W_{26}$ and a midpoint radius $R_{26MID}$, and a relative refractive index profile, $\Delta_{26}(r)$ in %, with a maximum relative refractive index percent, $\Delta_{26MAX}$, in %, a minimum relative refractive index percent, $\Delta_{26MIN}$, in %. According to the embodiments of the present invention $\Delta_{CMAX}$>$\Delta_{24MAX}$; $\Delta_{24MAX}$<$\Delta_{26MAX}$, and $\Delta_{CMAX}$>$\Delta_{26MAX}$. Preferably 0.9≥$\Delta_{CMAX}$≥0.6; $\Delta_{24MIN}$≤0.05; 0.17<$\Delta_{26MAX}$<0.25. More preferably 0<$\Delta_{24MIN}$≤0.05. Preferably $\Delta_{26MAX}$ is less than 0.2%, more preferably less than 0.15%. It is preferable that 1 µm≤$W_{24}$≤3 µm and 2 µm≤$W_{26}$≤5 µm. Most preferably, in order to provide a very large effective area, 2 µm≤$W_{26}$≤4.2 µm. More preferably $W_{26}$≤4 µm, and even more preferably $W_{26}$≤3.8 µm. Preferably the effective area of the core is greater than 75 µm, more preferably greater than 80 µm, and even more preferably greater than 85 µm, and even more preferably greater than 90 µm.

$Rc_1$ is defined to occur at the radius where $\Delta_{CORE}(r)$ first reaches +0.05%. That is, central core 22 ends and the first annular core region 24 starts where the relative refractive index first reaches +0.05% (going outward radially), and region 24 is defined to end at a radius $Rc_2$ where the relative refractive index $\Delta_{CORE}(r)$ again reaches 0.05%, going outward radially. It is noted that $\Delta_{24MIN}$<0.05. The second annular region 26 begins at $Rc_2$ and ends at $Rc_3$. For this group of embodiments $Rc_3$ is defined to occur where the relative refractive index drops to the value of 0.05% (going outward radially), after $\Delta_{CORE}(r)$ has reached to $\Delta_{26MAX}$. The width $W_{24}$ of the first annular core region 24 is $Rc_2$−$Rc_1$ and its midpoint $R_{2MID}$ is ($Rc_2$+$Rc_1$)/2. The width $W_{26}$ of the second annular core region 26 is $R_{3C}$−$R_{2C}$ and its midpoint $R_{3MID}$ is ($R_{2C}$+$Rc_3$)/2. In some embodiments, |$\Delta_{24}(r)$|<0.025% or |$\Delta_{24\ max}$−$\Delta_{24\ min}$|<0.05% for more than 50% of the radial width of the first annular core region 24, and in other embodiments |$\Delta_{24}(r)$|<0.01% for more than 50% of the radial width of the first annular core region 24. The refractive index delta $\Delta_{26}(r)$ is positive for all radii from $R_{2C}$ to $R_{C3}$. Preferably 0.05<$\Delta_{26MAX}$<0.25 (for example 0.1<$\Delta_{26MAX}$<0.25). The core 20 ends and the cladding 30 begins at a radius $R_{C3}$. Preferably, $R_{C3}$<10.5 µm.

The central core region 22 has a profile volume $V_{22}$ (% µm²), defined herein as:

$$\int_0^{R_{C1}} \Delta_{22}(r) r \, dr.$$

Preferably the central core region 22 has volume $V_{22}$ of less than 2% µm², more preferably no more than 1.95% µm².

The second annular core region 26 has a profile volume, $V_{26}$ (% µm²), defined herein as:

$$\int_{Rc_2}^{Rc_3} \Delta_{26}(r) r \, dr.$$

In the following embodiments the volume $V_{26}$ of second annular core region 26 is less than 4.5, and more preferably less than 4.4% µm². Preferably the volume of the second annular core region 26 is between 2 and 5.5% µm², more preferably between 2.4 and 4.4% µm². Preferably $V_{22}$+$V_{26}$<6.5% µm².

Preferably, 0.5%≤$\Delta_{CMAX}$<0.9%, in other cases, preferably 0.6%≤$\Delta_{CMAX}$≤0.8%, or 0.7%≤$\Delta_{CMAX}$≤0.8%. Preferably the alpha value of the central core region is 1≤α≤2, more preferable 1≤α≤1.6, more preferably 1≤α≤1.5 and even more preferably 1≤α≤1.4.

The core 20 ends and cladding 30 (the annular region 32) starts where the relative refractive index reaches +0.05% (going outward radially) at a radius $R_{C3}$. Cladding 30 comprises: (i) a first annular cladding region 32 surrounding the core 20 and directly adjacent thereto, extending radially outwardly to a second annular cladding region 34 and characterized by outer radius $R_{32}$, this region 32 having a width $W_{32}$ disposed at a midpoint $R_{32MID}$, and a relative refractive index profile, $\Delta_{32}(r)$ in %, with a maximum relative refractive index percent, $\Delta_{32MAX}$, in %, a minimum relative refractive index percent, $\Delta_{32\ MIN}$, in %; (ii) a second annular cladding region 34 surrounding region 32 and directly adjacent thereto, and extending radially outwardly from $R_{32}$ to an radius $R_{34}$; and (iii) a third annular region 36 surrounding region 34 and directly adjacent thereto. The second annular cladding region 34 has a width $W_{34}$ disposed at a midpoint $R_{34MID}$, and a relative refractive index profile, $\Delta_{34}(r)$ in %, with a minimum relative refractive index percent, $\Delta_{34MIN}$, in %, wherein $0 > \Delta_{34MIN}$. The third annular region 36 has relative refractive index percent, $\Delta_{36}(r)$. Preferably, the third annular region 36 is made of silica.

In these embodiments, region 32 ends at a radius $R_{32}$ where the relative refractive index first reaches −0.05%, going outward radially. The second annular cladding region 34 begins at $R_{32}$ and ends at $R_{34}$ for this group of embodiments. $R_{34}$ is defined to occur where the relative refractive index $\Delta_{34}(r)$ reaches the value of −0.05% (going outward radially), after $\Delta_{34}(r)$ has dipped to at least −0.2%. The width $W_{32}$ of the first annular cladding region is $R_{32}$-$R_D$ and its midpoint $R_{32MID}$ is $(R_{C3}+R_{32})/2$. In some embodiments, more than 90% of the radial width of the first annular cladding region segment has a positive or zero relative refractive index, and in some embodiments $\Delta_{32}(r)$ is positive or zero for all radii from $R_{C3}$ to $R_{32}$. In some embodiments, $|\Delta_{32}(r)|<0.025\%$, or $|\Delta_{32max}-\Delta_{32min}|<0.05\%$ for more than 50% of the radial width of the first annular region 32, and in other embodiments $|\Delta_{32}(r)|<0.01\%$ for more than 50% of the radial width of the first annular region 32. The average of $\Delta_{34}$ is negative and the effective relative index of refraction for region 34 is negative for all radii from $R_{32}$ to $R_{34}$. Preferably, $\Delta_{CLAD}(r)=0\%$ for all radii greater than 25 μM. Cladding 30 extends through the third annular cladding region 36 to a radius, $R_{36}$, which is also the outermost periphery of the glass part of the optical fiber. Also, $\Delta_{32MIN}>\Delta_{34MIN}$; $\Delta_{34MIN}<\Delta_{36MIN}$, and preferably $\Delta_{32MAX}=\Delta_{36MAX}$. Preferably, $-0.9 \leq \Delta_{34MIN} \leq -0.1$. More preferably $-0.6 \leq \Delta_{34MIN} \leq -0.2$. In one set of embodiments, the second annular region 34 comprises silica glass having a dopant selected from the group consisting of germanium, aluminum, phosphorus, titanium, boron, and fluorine. In another set of embodiments, the second annular region 34 comprises silica based glass (either pure silica, or silica doped with germanium, aluminum, phosphorus, titanium, boron, and fluorine, or combinations thereof) with a plurality of closed randomly dispersed holes 34A, the holes being either empty (vacuum) or gas filled, wherein the holes can provide internal reflection of light, thereby providing waveguiding to light traveling along the core. Such holes can provide an effective refractive index which is low compared to pure silica. For example, in some embodiments that utilize the second annular region 34 with dispersed holes 34A, $\Delta_{34min}$ is −0.3% to −3%, preferably −0.5% to −3%, more preferably −1% to −3%, (e.g., −0.2%, −0.3%, −0.35%; −0.4%; −0.45%; −0.5%; −0.6%; −0.7% , −0.9%, −1%; −1.25%; −1.5%, −1.75%; −2%, −2.25%; −2.5% or −3%).

More specifically, in the fiber embodiments that utilize gas filled holes 34A, the relative percent index of refraction $\Delta_{34}(r)$ in second annular region 34 fluctuates between −28% (index of void filled gas relative to that of silica) and that of the glass surrounding the voids (in this example it is silica, with the relative % index of refraction of about 0%). A typical average relative refractive index percent $\Delta_{34}$ of the second annular cladding region 34 will be, for example, less than −0.8%, and usually between −1% and −3%, relative to pure silica glass, depending on the dopants present in the glass surrounding the voids. That is, the index second annular region fluctuates, and the width of the gas filled voids, and/or the glass filled spacing $S_v$ between the gas filled voids (i.e., holes) is randomly distributed and/or are not equal to one another. That is, the voids are non-periodic. It is preferable that the mean distance between the voids is less than 5000 nm, more preferably less than 2000 nm, even more preferably less than 1000 nm, for example 750 nm, 500 nm, 400 nm, 300 nm, 200 nm or 100 nm. Prefer-ably, at least 80% , and more preferably at least 90% of the voids have a maximum cross-sectional dimension Di of less than 1500 nm, more preferably less than 1000 nm, and even more preferably less than 500 nm. Even more preferably, the mean diameter of the voids is less than 1500 nm, preferably less than 1000 nm, more preferably less than 500 nm, and even more preferably less than 300 nm. The voids 34A are closed (surrounded by solid material) and are non-periodic. That is, the voids 34A may have the same size, or may be of different sizes. The distances between voids may be uniform (i.e., the same), or may be different. Preferably the second annular region 34 contains at least 50 holes 34A. Preferably, a cross section of the second annular region 34 contains at least 50 voids, preferably at least 100 voids and even more preferably more than 200 voids.

Preferably, $R_{32}>12$ μm, more preferably >13.0 μm, more preferably >15.0 μm, and even more preferably $\geq 18.0$ μm, and in some embodiments 13.0 μm$\leq R_{32} \leq 22$ μm. For example, $R_{32}$ maybe 14 μm, 15 μm, 16 μm, 16.5 μm, 17 μm, 17.5 μm, 18 μm, 18.5 μm, 19 μm, 19.5 μm, 20 μm, 20.5 μm or 21 μm. More preferably 16.0 μm$\leq R_{32} \leq 21$ μm and most preferably 18.0 μm$\leq R_{32} \leq 20$. In some embodiments $W_{34}>1.0$ μm, and in other embodiments 1.0 μm$<W_{34}<10$ μm, in some embodiments less than 8.0 μm, and in other embodiments 2.0 μm$<W_{34}<6.0$ μm. Preferably 3.0 μm$<W_{34}<6.0$ μm.

Preferably, $R_{36}>40$ μm. In some embodiments, $R_{36}>50$ μm. In other embodiments, $R_{36}>60$ μm. In some embodiments, 60 μm$<R_{36}<70$ μm.

In some embodiments, the central segment of the core 22 may comprise a relative refractive index profile having a so-called centerline dip which may occur as a result of one or more optical fiber manufacturing techniques. For example, the central segment may have a local minimum in the refractive index profile at radii less than 1 μm, wherein higher values for the relative refractive index (including the maximum relative refractive index for the core segment) occur at radii greater than r=0 μm.

Preferably, the optical fiber disclosed herein provides: a mode field diameter at 1550 nm of 9.8 μm to 11.6 μm, more preferably 10.0 μm to 11.0 μm; a zero dispersion wavelength between 1460 nm and 1520 nm (for example 1470 nm, 1480 nm, 1490 nm, 1500 nm, 1510 nm); and a cabled cutoff wavelength less than 1500 nm, and more preferably less than 1450, even more preferably less than 1350 nm, even more preferably less than 1260 nm. As the cabled cutoff wavelength is not more than (and in some embodiments about equal to) the 2 m fiber cutoff wavelength, a 2 m fiber cutoff wavelength of less than 1450 nm results in a cable cutoff wavelength less than 1450 nm.

According to embodiments of optical fiber, the fiber dispersion at 1550 nm is preferably 3-6 ps/nm/km, more preferably 4-5 ps/nm/km, which corresponds to fibers with effective area (at 1550 nm) range at 1550 nm of about 75 μm² to about 120 μm² or larger. Preferably, the effective area of the fiber is at least 75 μm², and more preferably at least 80 μm², and more preferably at least 85 μm², even more preferably at least 90 μm², or at least 100 μm². A typical range of effective areas at 1550 nm is about 80 μm² to about 100 μm² or to about 110 μm². It is preferred that the kappa, which is the ratio between the dispersion and the dispersion slope, at 1550 nm to be between 45 nm and 85 nm. For example, kappa value may be 46, 48, 50, 52, 65, 70 or 76 nm. However, a practical design selection is also dependent on the bending loss requirement. In some embodiments, the exemplary optical fibers exhibit mode field diameter at 1550 nm of 9 μm to 12 μm (for example, 9.5, 10, 10.5 or 11 μm); a zero dispersion wavelength between 1480 and 1510 nm, and preferably, the cabled cutoff wavelength of less than 1500 nm.

Tables 1-2 list characteristics of six illustrative examples, of a first set of embodiments, as well as that of LEAF® fiber available from Corning Inc., of Corning N.Y. The refractive index profiles of these examples are similar to FIG. 1 and have the values depicted in Table 1, below. As shown in Table 1, in order to obtain desired optical performance we varied several of these parameters. More specifically these parameters to obtain fiber dispersion values and dispersion slopes similar the LEAF® fiber. For example, the dispersion of the exemplary fibers depicted in Table 1 is between 4.35 ps/nm/km and 4.79 ps/nm/km at the wavelength of 1550 nm.

matic dispersion and cable cutoff are similar to those of LEAF® fiber.

Several specific design factors are considered related to the optical effect of the cladding region 34. One such factor is related to the cutoff wavelength of the fiber. LEAF® fiber has high theoretical cutoff up to 1.82 μm. But, because of the sensitivity of higher order mode to the bending introduced in the practical deployment environment, the actual cutoff or cabled cutoff wavelength of LEAF® fiber is below 1500 nm.

TABLE 1

|  | LEAF ® | Example 1 | Example 2 | Example 3 | Example 4 | Example 5 | Example 6 |
|---|---|---|---|---|---|---|---|
| $\Delta_{CMAX}$ | 0.7 | 0.7 | 0.6 | 0.6 | 0.6 | 0.6 | 0.6 |
| $R_{Cla}$ | 0.39 | 0.39 | 0.39 | 0.39 | 0.39 | 0.39 | 0.39 |
| $\Delta_{22bMAX}$ | 0.643 | 0.586 | 0.596 | 0.611 | 0.615 | 0.625 | 0.603 |
| $Rc_1$ | 3.717 | 3.819 | 3.785 | 3.507 | 3.478 | 3.21 | 3.362 |
| Core Alpha α | 1.33 | 1.1 | 1.1 | 1.1 | 1.1 | 1.1 | 1.1 |
| $R_{3MID}$ | 7.434 | 8.5 | 8.5 | 8.0 | 8.0 | 8.0 | 8 |
| $W_{26}$ (μm) | 4.49 | 3.8 | 3.8 | 3.8 | 3.8 | 3.8 | 3.8 |
| $\Delta_{26MAX}$ | 0.137 | 0.137 | 0.137 | 0.11 | 0.11 | 0.11 | 0.08 |
| $\Delta_{24MIN}$ | 0.008 | 0.008 | 0.008 | 0.008 | 0.008 | 0.008 | 0.008 |
| $R_{32}$ | n/a | 18 | 18 | 18 | 20 | 20 | 20 |
| $R_{34}$ | n/a | 22.5 | 22.5 | 22.5 | 23.5 | 23.5 | 23.5 |
| $\Delta_{34MIN}$ | 0 | −0.5 | −0.5 | −0.5 | −0.5 | −0.5 | −0.5 |
| Δ32MIN | 0 | 0 | 0 | 0 | 0 | 0 | 0 |
| $W_{24}$ (μm) | 1.472 | 2.781 | 2.815 | 2.593 | 2.622 | 2.89 | 2.738 |
| $V_{22}$ (% × μm²) | 1.96 | 1.69 | 1.68 | 1.493 | 1.4795 | 1.292 | 1.2482 |
| $V_{26}$ (% × μm²) | 4.56 | 4.4 | 4.4 | 4.14 | 3.322 | 3.322 | 2.41 |

TABLE 2

|  | LEAF ® | Example 1 | Example 2 | Example 3 | Example 4 | Example 5 | Example 6 |
|---|---|---|---|---|---|---|---|
| Dispersion @ 1550 nm | 4.1 | 4.72 | 4.71 | 4.79 | 4.35 | 4.67 | 4.42 |
| Slope @ 1550 nm | 0.0822 | 0.0916 | 0.0915 | 0.0935 | 0.0931 | 0.104 | 0.0905 |
| Kappa | 49.88 | 51.53 | 51.48 | 51.23 | 46.72 | 44.90 | 48.84 |
| Aeff @1550 nm | 72.5 | 91.2 | 91.75 | 91.07 | 91.59 | 105.3 | 91.3 |
| MFD @ 1550 nm | 9.8 | 10.9 | 10.9 | 10.88 | 10.9 | 11.52 | 10.92 |
| Cutoff LP02 w/o trench | 162 | 1.61 | 1.61 | 1.48 | 1.48 | 1.46 | 1.38 |
| Cutoff LP11 w/o trench | 1.82 | 1.81 | 1.81 | 1.58 | 1.58 | 1.57 | 1.36 |
| Cutoff LP02 w/ trench | n/a | 1.44 | 1.44 | 1.31 | 1.34 | 1.32 | 1.21 |
| Cutoff LP11 w/ trench | n/a | 1.61 | 1.61 | 1.42 | 1.45 | 1.44 | 1.25 |
| Bending Loss @ 1.5 cm Radius @1550 nm (dB/m) | 0.485 | 0.053 | 0.053 | 0.092 | 0.2 | 0.59 | 0.32 |
| Normalized Bending Loss @1.5 cm Radius @1550 nm (dB/m) | 1 | 0.11 | 0.11 | 0.19 | 0.47 | 1.22 | 0.66 |

Fiber examples 1, 2, 3, 4 and 6 have high effective area of about 91 μm². Zero dispersion wavelengths for all fibers in Table 1 are at about 1500 nm. While not wishing to be bound by theory, applicants believe that as the result of the larger effective area than that of LEAF® fiber, the dispersion slope of fibers 1, 2, 3, 4 and 6 at 1550 nm is in higher than that of LEAF® fiber by about 0.01 ps/km/nm². In addition, bending induced loss of fibers 1, 2, 3, 4 and 6 is minimized (relative to that of LEAF® fiber) due to utilization of the second annular cladding region 34. Other optical properties such as the chro Therefore, it may be preferable to choose the fiber parameters to achieve the bending loss of the newly designed fibers such that: (i) the higher order modes in these fibers can have high enough loss (greater than 0.85 dB/m at 1500 nm) in higher order modes in practical deployment conditions to lower the cabled cutoff, while (ii) the fundamental mode bending loss is still at an acceptable level i.e., less than 5 dB/m at 15 mm radius. Preferably the fundamental mode bending loss is less than 2 dB/m at 15 mm, more preferably less than 1 dB/m at 15 mm radius, and even more preferably less than 0.5 dB/m at 1550 nm when the fiber is wrapped around the mandrel with a 15 mm radius. The desired bending loss can be achieved by adjusting: (i) the location of the cladding region 34, (ii) $\Delta_{34MIN}$; and/or (iii) the width $W_{34}$ of the cladding region 34. In general, making $\Delta_{34MIN}$ less negative, and/or making the $W_{34}$ smaller can increase the bending loss of the fiber. The role of the location of the cladding region 34 is more complicated. When we place cladding region 34 closer to the core center, for example with $R_{32}$ being about below 13 µm, bending loss becomes high. Preferably $R_{32} > 15$ µm, and more preferably $>16$ µm. When $R_{32}$ is 18 µm or larger, the bending loss has very low values as illustrated in fiber examples of Table 1 and Table 2, but increases with increase of the core center radius $R_{C1}$. It is preferable we further optimize the parameters of cladding region 34 with the assist of experimental data to achieve a desired bending performance to meet the requirement both from the fiber cable cutoff and overall bending loss performance.

Two other factors are related to the optical properties of the fiber and the consistency of fiber manufacturing. In general, the cladding region 34 has the negative effects of increasing the fiber dispersion and dispersion slope. Placing the cladding region 34 far away from the fiber center has the benefit of reducing the effect of the cladding region 34 on the dispersion, dispersion slope and effective area to a minor level. An additional benefit of placing the cladding region 34 far away from the fiber core is to improve the consistency of the optical properties across the fiber. Depending on the specific manufacturing process, the parameter of the cladding region 34 may vary slightly along the fiber, resulting in the change of optical properties. When the cladding region 34 is placed sufficiently far away from the fiber core, the effect of the cladding region 34 variation on the fiber dispersion, dispersion slope, and effective area is also reduced.

In each of the example of Fiber 1, 2, 3, 4 and 6, we have focused on slightly different design aspect. For example, exemplary fiber 2 has a slightly lower delta in region 22a (center line height) relative to that of exemplary fiber 1, so that exemplary fiber 2 may be easier to manufacture. We fine tuned the fiber profile of example 2 fiber to arrive at the parameters of example 3 fiber, in order to lower the fiber's theoretical cut off wavelength (i.e., calculated fiber core cutoff wavelength, without the region 34 effect taken into account, (see LP11 in Table 2)) from 1810 nm to 1580 nm. A manufactured fiber made according to parameters of example 3 will have a cabled cutoff wavelength below 1500 nm. The fiber of example 6 has theoretical cut off wavelength of 1380 nm (see LP02 in Table 2) so that the cabled cutoff of the fiber made according to example 6 will be below 1300 nm, making this design suitable for both the 1310 nm and 1550 nm windows. We modified the fiber parameters of example 3 fiber to arrive at example 4 fiber, which has lower fiber dispersion at 1550 nm than the fiber of example 3.

The example 5 fiber has a bend loss comparable to LEAF® fiber but has a much larger effective area of 105.3 µm². Other fiber attributes are similar to that of LEAF® fiber, with the exception of a slightly higher dispersion slope of 0.104 ps/nm²/km.

The optical fibers disclosed herein exhibit superior bend resistance, both macrobend and microbend. In order to predict the macrobending performance of the fibers, we have used the finite element method to model the bending properties of the optical waveguide. The scheme is based on fully vectorial Maxwellian equations. The bending of an optical fiber is considered as geometrical distortion as described by the conformal transformation that was described in the reference by M. Heiblum, and J. H. Harris, "Analysis of curved optical waveguides by conformal transformation", IEEE J. Quantum Electronics, QE-11, (2), 75-83 (1975). The curved fiber is replaced by a straight fiber with equivalent refractive index distribution, $$n_{eq}(x, y) = n(x, y) \exp\left(\frac{p}{R}\right) \quad (1)$$

where p=x or y, depending on the bending direction, and R stands for the effective bend radius. In the modeling, the bending direction is always chosen to be in the x direction. When a fiber is bent, the refractive index is tilted. The cladding index in certain regions can be higher than the index in the core. This results in leaky mode loss for the core modes. The loss of the optical wave due to the infinite space in the direction normal to the interface of the fiber outer surface can be emulated by perfectly matched layer (PML) outside the fiber, which has been described in Reference by Jianming Jin, "The finite element method in electromagnetics", Wiley Inerscience, (2002). In our modeling, we have implemented the PML in the cylindrical coordinate system. We obtain the complex effective index for each mode. The effective index of each mode is then converted into the effective propagation constant, $\beta$, which is related to the effective index in a simple relation, $$\beta = \frac{2\pi}{\lambda} n_{\it{eff}}.$$

The imaginary part of the propagation is related to the leaky mode loss in an equation defined as follows, $$A = \frac{20}{\ln(10)} \mathrm{Im}(\beta) \quad (2)$$

The leaky mode loss A is in the unit of dB/m. In Table 2, the bending loss of the exemplary fibers are calculated at 1550 nm for a bending radius of 15 mm. The modeling results are presented both in absolute values and in normalized forms. The normalized bending loss is the ratio of the bending loss of the particular fiber to that of the LEAF®. Modeling results of the exemplary fibers 1-6 showed bend loss of fibers wrapped around a 15 mm radius mandrel, measured at 1550 nm, of less than 7 dB/m. In many embodiments the bend loss is less than 5 dB/m. In some embodiments, the bend loss was less than 3.5 dB/m, in some embodiments less than 1 dB/m, and in some embodiments less than 0.5 dB/m, when measured at 1550 nm on a 15 mm diameter mandrel In some embodiments, as exhibited by Example 1-4 and 6-8, the predicted bending loss is between 0.05 dB/m and 0.6 dB/m. We also conducted a comparison of the modeling results with the existing measurement results on fibers such as LEAF to gain insight on how we can utilize the bending modeling to judge a fiber's relative bending performance compared to a standard LEAF® fiber manufactured by Corning, Inc. Note that the bending loss of the commercially available LEAF® fiber is well characterized, with induced calculated losses of about 0.485 dB/m at a bend diameter of 15 mm and a wavelength of 1550 nm. The relative bending loss of the exemplary LEAF® fiber is thus used to gauge the bending performance of the exemplary fibers. The normalized bending loss of the exemplary fibers 2-6 at 1550 m with 15 mm radius bending is between 0.11 and 1.22. The bending performance can be further optimized by changing the location of the second cladding region 34.

The LP11 theoretical cutoff wavelength of the exemplary fibers is high. But typically, for LEAF® fiber, despite of the high theoretical cutoff, the cabled cutoff can be much lower, for example lower than 1500 nm. Without the cladding region 34, the bending loss of the example fibers with larger effective areas would be about a factor of 50 higher than that of the LEAF® fibers. Cladding region 34 improves the bending performance of the large effective area fibers of Table 1 to the level similar to or better than that of the LEAF® fiber. Much better bending property may yield higher cabled cutoff as the bending loss for higher order modes play the role of reducing the cabled cutoff. Therefore, if cutoff performance similar to that of LEAF® fiber is desired, the optimum bending loss of newly designed fiber should be similar to or comparable to the bending loss of existing LEAF® fiber. As illustrated by Examples 1-5 without the cladding region 34, the LP11 theoretical cutoff wavelengths are similar to those of the LEAF® fiber. Therefore, with similar bending loss at 1550 nm for the exemplary fibers, we expect that these fibers will also have similar cutoff behavior.

The core fiber 20 of the optical fiber 10 shown in FIGS. 1A, 1B has a refractive index profile either has a step shape, or a rounded step shape or an alpha shape with the alpha taking a finite value. However, the core 20 could have other values of $\Delta_1$, or the core could have a profile shape other than an alpha profile, such as a multi-segmented core, which will be additional examples presented below.

2$^{nd}$ Set of Embodiments

Tables 3-4 list characteristics of five illustrative examples, of a second set of embodiments. The refractive index profiles of these examples are similar to FIG. 1A and have the values depicted in Table 3, below. As shown in Table 3, in order to obtain desired optical performance we varied several of these parameters. More specifically these parameters to obtain fiber dispersion values and dispersion slopes similar to the LEAF® fiber. For example, the dispersion of the exemplary fibers 7, 8 and 11 as given in Table 4 is between 4.69 ps/nm/km and 5.17 ps/nm/km at the wavelength of 1550 nm. The dispersion values of examples 9 and 10 are slightly higher, but the Kappa values are still less than 80 nm at 1550 and the zero dispersion wavelength is greater than 1470 nm.

TABLE 3

|  | Example 7 | Example 8 | Example 9 | Example 10 | Example 11 |
|---|---|---|---|---|---|
| $\Delta_{CMAX}$ | 0.723 | 0.831 | 0.785 | 0.762 | 0.7845 |
| $R_{C1a}$ | 0 | 0 | 0 | 0 | 0.5 |
| $\Delta_{22bMAX}$ | 0.723 | 0.831 | 0.785 | 0.762 | 0.623 |
| $Rc_1$ | 3.225 | 2.825 | 2.8 | 2.875 | 3.425 |
| Core Alpha $\alpha$ | 1.24 | 1.27 | 1.40 | 1.41 | 1.53 |
| $R_{3MID}$ | 6.68 | 5.95 | 5.89 | 6.38 | 7.64 |
| $W_{26}$ | 4.105 | 3.255 | 3.035 | 2.05 | 3.15 |
| $\Delta_{26MAX}$ | 0.148 | 0.201 | 0.231 | 0.208 | 0.102 |
| $\Delta_{24MIN}$ | 0.02 | 0.02 | 0.019 | 0.018 | 0.0436 |
| $R_{32}$ | 17.63 | 13.63 | 13.1 | 13.1 | 17.85 |
| $R_{34}$ | 20.35 | 16.35 | 16.25 | 16.7 | 20.1 |
| $\Delta_{34MIN}$ | −1 | −1 | −1 | −1 | −1 |
| $\Delta 32MIN$ | 0 | 0 | 0 | 0 | 0 |
| $W_{24}$ | 1.4025 | 0.498 | 1.5725 | 2.48 | 2.64 |
| $V_{22}$ (% × μm$^2$) | 1.4887 | 1.3254 | 1.3 | 1.3347 | 1.94 |
| $V_{26}$ (% × μm$^2$) | 4.06 | 3.92 | 4.15 | 2.73 | 2.48 |

TABLE 4

|  | Example 7 | Example 8 | Example 9 | Example 10 | Example 11 |
|---|---|---|---|---|---|
| Dispersion @ 1550 nm (ps/nm/km) | 5.46 | 5.17 | 6.69 | 8.28 | 4.69 |
| Slope @ 1550 nm (ps/nm2/km) | 0.107 | 0.094 | 0.107 | 0.104 | 0.075 |
| Zero Dispersion (nm) | 1499 | 1495 | 1487 | 1471 | 1487 |
| Kappa (nm) | 51.01 | 54.81 | 62.76 | 79.35 | 62.95 |
| Aeff @1550 nm (sq. um) | 80.80 | 82.54 | 85.88 | 89.68 | 65.82 |
| MFD @ 1550 nm (um) | 10.12 | 10.37 | 10.39 | 10.56 | 9.43 |
| 1550 nm Attenuation (dB/km) | 0.199 | 0.196 | 0.199 | 0.199 | 0.195 |
| Cable Cutoff (um) | 1.40 | 1.30 | 1.43 | 1.45 | 1.20 |
| Bending Loss @ 15 mm Radius (dB/m) | 0.46 | 0.89 | 0.29 | 0.44 | 0.58 |

Figure 3:
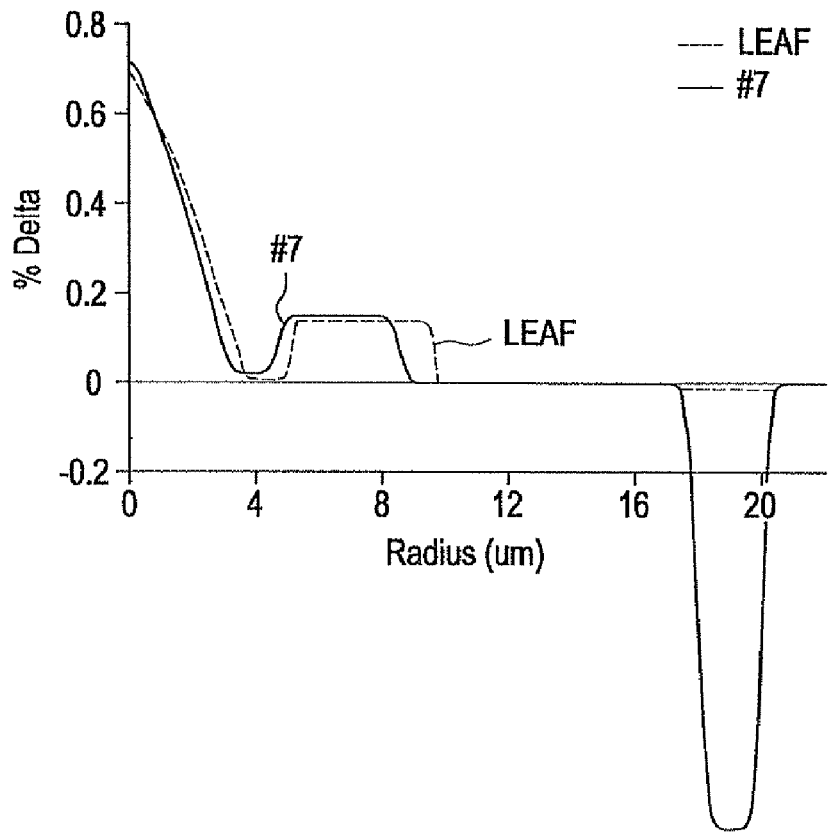
FIG. 3 shows a relative refractive index profile of Corning LEAF fiber and of another embodiment of an optical waveguide fiber as disclosed herein.
Figure 4:
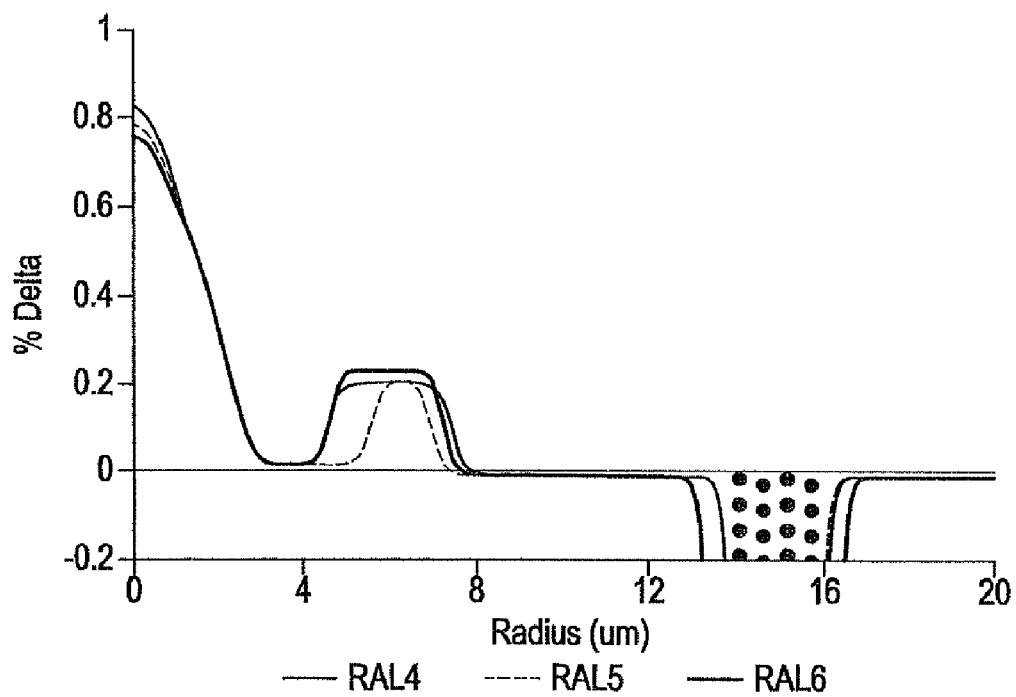
FIG. 4 shows a relative refractive index profile of other embodiments of the optical waveguide fiber as disclosed herein.

In fiber examples 7, 8, 9 and 10 we illustrate several fibers with high effective areas of 80 μm$^2$, or greater. While not wishing to be bound by theory, applicants believe that as the result of the larger effective area than that of LEAF® fiber, the dispersion slope of fibers 7, 8, 9 and 10 at 1550 nm is in higher than that of LEAF® fiber by about 0.01 ps/km/nm$^2$. The effective area of example 11 is lower than that of LEAF® fiber, but the cabled cutoff wavelength is below 1260 nm, which enables the fiber to be used in the 1300 nm window. The dispersion slope has also been reduced, which makes dispersion compensation in the 1550 nm window (c-band) easier by increasing the kappa value. In addition, bending induced loss of fibers 7-11 is minimized (relative to that of LEAF® fiber) due to utilization of the second annular cladding region 34. FIGS. 3 and 4 illustrate refractive index profiles of LEAF® fiber and that of fibers of examples 7, 9, 10, and 11.

Preferably, the optical fibers disclosed herein have low water content, and preferably are low water peak optical fibers, i.e. having an attenuation curve which exhibits a relatively low, or no, water peak in a particular wavelength region, especially in the E-band.

Methods of producing low water peak optical fiber can be found in U.S. Pat. No. 6,477,305, U.S. Pat. No. 6,904,772, and PCT Application Publication No. WO01/47822.

All of the optical fibers disclosed herein can be employed in an optical signal transmission system, which preferably comprises a transmitter, a receiver, and an optical transmission line. The optical transmission line is optically coupled to the transmitter and receiver. The optical transmission line preferably comprises at least one optical fiber span, which preferably comprises at least one section of the optical fiber disclosed herein Optical transmission line allows transmission of an optical signal between transmitter and receiver. The system preferably further comprises at least one amplifier, such as a Raman amplifier, optically coupled to the optical fiber section. The system further preferably comprises a multiplexer for interconnecting a plurality of channels capable of carrying optical signals onto the optical transmission line, wherein at least one, more preferably at least three, and most preferably at least ten optical signals propagate at a wavelength between about 1260 nm and 1625 nm. Preferably, at least one signal propagates in one or more of the following wavelength regions: the 1310 nm band, the E-band, the S-band, the C-band, and the L-band.

In some preferred embodiments, the system is capable of operating in a coarse wavelength division multiplex mode wherein one or more signals propagate in at least one, more preferably at least two of the following wavelength regions: the 1310 nm band, the E-band, the S-band, the C-band, and the L-band. In one preferred embodiment, the system operates at one or more wavelengths between 1530 nm and 1565 nm. In one embodiment, the transmission system utilizing the fiber operates at: at least 40 Gbits/sec with ether (i) time division multiplexing (TDM) transmission, or (ii) wavelength division multiplexing. Therefore, according to some embodiments, the optical transmission system comprises a transmitter, a receiver and an optical fiber according to the present invention situated there between, the fiber having a data transmission rate of at least 40 Gbit/sec.

It is to be understood that the foregoing description is exemplary of the invention only and is intended to provide an overview for the understanding of the nature and character of the invention as it is defined by the claims. The accompanying drawings are included to provide a further understanding of the invention and are incorporated and constitute part of this specification. The drawings illustrate various features and embodiments of the invention which, together with their description, serve to explain the principals and operation of the invention. It will become apparent to those skilled in the art that various modifications to the preferred embodiment of the invention as described herein can be made without departing from the spirit or scope of the invention as defined by the appended claims.

What is claimed is:

1. An optical fiber comprising:
(i) a glass core (20) extending from a centerline and including a central core region (22) with an alpha value of less than 2 and comprising a maximum relative refractive index percent, $\Delta_{CMAX}$, the central core region (22) having volume $V_{22}$; a first annular core region (24) surrounding the central core region (22); and a second annular core region (26) surrounding the first annular core region (24) and having volume $V_{26}$, wherein the second annular core region (26) has
(a) a higher maximum relative refractive index percent $\Delta_{26MAX}$ than that maximum relative refractive index percent $\Delta_{24MAX}$ of the first annular core region (24), and
(b) volume $V_{26}$<4.5% $\mu m^2$ and $V_{22}+V_{26}$<6.5% $\mu m^2$;
(ii) a glass cladding (30) surrounding and in contact with the core, the cladding comprising:
a first annular cladding region (32) extending from a radius $R_{C3}$ to a radius $R_{32}$, wherein $R_{32}$>13 $\mu m$ and comprising relative refractive index percent $\Delta_{32}(r)$ %, a maximum relative refractive index percent, $\Delta_{32\,MAX}$ and a minimum relative refractive index percent, $\Delta_{32\,MIN}$;
a second annular cladding region (34) extending from the radius $R_{32}$ to a radius $R_{34}$ and comprising relative refractive index percent $\Delta_{34}(r)$ % and a minimum relative refractive index percent, $\Delta_{34\,MIN}$;
a third annular cladding region (36) surrounding the second annular cladding region (34) and extending from the radius $R_{34}$ to an outermost glass radius $R_{36}$;
wherein $\Delta_{CMAX}$>$\Delta_{26MAX}$>$\Delta_{32MAX}$; $\Delta_{32MIN}$>$\Delta_{34MIN}$, and $\Delta_{34MIN}$<−0.1; and
the core and the cladding provide a fiber with cable cutoff less than 1500 nm, dispersion D at 1550 nm of 3≦D≦8 ps/nm/km, and an effective area at 1550 nm greater than 80 $\mu m^2$, and bend losses less than 5 dB/m at 1550 nm when the fiber is wrapped around 15 mm radius mandrel.

2. The optical fiber according to claim 1, wherein said dispersion D is less than 6 ps/nm/km at 1550 nm and said effective area at 1550 nm is greater than 85 $\mu m^2$.

3. The optical fiber according to claim 1, wherein said an effective area at 1550 nm is greater than 90 $\mu m^2$.

4. The optical fiber according to claim 1, wherein said an alpha value of less than 1.5.

5. The optical fiber according to claim 1, wherein said radius $R_{32}$ is greater than 16 $\mu m$.

6. The optical fiber according to claim 1, wherein said radius $R_{32}$ is at least 20 $\mu m$.

7. The optical fiber according to claim 1, wherein said radius $R_{32}$ is at least 18 $\mu m$ and said effective area at 1550 nm is greater than 90 $\mu m^2$.

8. The optical fiber according to claim 1, wherein $\Delta_{26MAX}$ is less than 0.15%.

9. The optical fiber according to claim 8, wherein said second annular core region has width $W_{26}$, and 2.5 $\mu m \leq W_{26} \leq 4$ $\mu m$.

10. The optical fiber according to claim 1, said fiber having dispersion slope less than 0.12 ps/nm$^2$/km and kappa less than 80 nm at 1550 nm, and bend losses less than 1 dB/m at 1550 nm when the fiber is wrapped around a mandrel having 15 mm radius.

11. The optical fiber according to claim 1, said fiber having dispersion slope less than 0.12 ps/nm$^2$/km, kappa less than 80 nm at 1550 nm, and bend losses less than 0.5 dB/m at 1550 nm when the fiber is wrapped around a mandrel having 15 mm radius.

12. The optical fiber according to claim 10, wherein radius $R_{34}$ is at least 18 $\mu m$.

13. The optical fiber according to claim 1, wherein said central core region has an outer radius $Rc_1$ and 2.5 $\mu m \leq Rc_1 \leq 4$ $\mu m$; and wherein said first annular core region has width $W_{24}$, and 1 $\mu m \leq W_{24} <3$ $\mu m$, and said second annular core region has width $W_{26}$, and 2 $\mu m < W_{26} \leq 4$ $\mu m$.

14. The optical fiber of claim 1, wherein said second annular region comprises silica based glass with a plurality of closed randomly dispersed holes situated therein.

15. The optical fiber of claim 14, wherein said second annular cladding region comprises silica based glass with at least 50 closed randomly dispersed holes situated therein, and (i) mean distance between the holes is less than 5000 nm, and (ii) at least 80% of the holes have a maximum cross-sectional dimension Di of less than 1500 nm.

16. An optical fiber comprising:
(i) a glass core (20) extending from a centerline and including a central core region (22) with an alpha value of less than 2, said central core region (22) has volume $V_{22}$<2% $\mu m^2$, and an outer radius $Rc_1$ and 2.5 $\mu m \leq Rc_1 \leq 4$ $\mu m$; a first annular core region (24) surrounding the central core region (22), and a second annular core region (26) surrounding the first annular core region (24), wherein the second annular core region (26) has a higher maximum relative refractive index percent $\Delta_{26MAX}$ than a maximum relative refractive index percent $\Delta_{24MAX}$ of the first annular core region (24), said second annular core region has width $W_{26} \leq 4.2$ $\mu m$; and
(ii) a glass cladding (30) surrounding and in contact with the core, the cladding comprising:
a first annular cladding region (32) extending from a radius $R_{C3}$ to a radius $R_{32}$, wherein $R_{32}$>15 $\mu m$;
a second annular cladding region (34) extending from the radius $R_{32}$ to a radius $R_{34}$ and having minimum relative refractive index percent, $\Delta_{34\ MIN}$, the second annular cladding region comprises silica based glass with at least 50 closed randomly dispersed holes situated therein, and (i) mean distance between the holes is less than 5000 nm, and (ii) at least 80% of the holes have a maximum cross-sectional dimension Di of less than 1500 nm; and a third annular cladding region (36) surrounding the second annular region (34) and extending from the radius $R_{34}$ to an outermost glass radius $R_{36}$;

wherein the core (20) comprises a maximum relative refractive index percent, $\Delta_{CMAX}$; wherein said first annular cladding region (32) comprises relative refractive index percent $\Delta_{32}(r)$ %, a maximum relative refractive index percent, $\Delta_{32\ MAX}$, and a minimum relative refractive index percent, $\Delta_{32\ MIN}$;

wherein $\Delta_{CMAX} > \Delta_{26MAX} > \Delta_{32MAX}$; $\Delta_{32\ MIN} > \Delta_{34MIN}$, and $\Delta_{34MIN} < -0.1$; and wherein the core and the cladding provide a fiber with cable cutoff less than 1500 nm, dispersion D at 1550 nm of $3 \leq D \leq 8$ ps/nm/km, an effective area at 1550 nm greater than 80 µm²; dispersion slope less than 0.12 ps/nm²/km, kappa less than 80 nm at 1550 nm, and bend losses less than 5 dB/m when the fiber is wrapped around a mandrel having 15 mm radius.

17. The optical fiber according to claim 14, wherein said an effective area at 1550 nm is greater than 85 µm².

18. The optical fiber according to claim 14, wherein said an alpha value of less than 1.5.

19. The optical fiber according to claim 14, wherein said radius $R_{32}$ is at least 18 µm.

20. An optical fiber comprising:
(i) a glass core (20) extending from a centerline and including a core region (22) with an alpha value of less than 2 and comprising a maximum relative refractive index percent, $\Delta_{CMAX}$, the central core region (22) having volume $V_{22}$; a first annular core region (24) surrounding the central core region (22); and a second annular core region (26) surrounding the first annular core region (24), wherein the second annular core region (26) has a higher maximum relative refractive index percent $\Delta_{26MAX}$ than that maximum relative refractive index percent $\Delta_{24MAX}$ of the first annular core region (24), and volume $V_{26}$, and $V_{22}+V_{26} < 6.5\%$ µm²;

(ii) a glass cladding (30) surrounding and in contact with the core, the cladding comprising:
a first annular cladding region (32) extending from a radius $R_{C3}$ to a radius $R_{32}$, wherein $R_{32} \geq 13$ µm and comprising relative refractive index percent $\Delta_{32}(r)$ %, a maximum relative refractive index percent, $\Delta_{32\ MAX}$ and a minimum relative refractive index percent, $\Delta_{32\ MIN}$;

a second annular cladding region (34) extending from the radius $R_{32}$ to a radius $R_{34}$ and comprising relative refractive index percent $\Delta_{34}(r)$ % and a minimum relative refractive index percent, $\Delta_{34\ MIN}$;

a third annular cladding region (36) surrounding the second annular region (34) and extending from the radius $R_{34}$ to an outermost glass radius $R_{36}$;

wherein $\Delta_{CMAX} > \Delta_{26MAX} > \Delta_{32MAX}$; $\Delta_{32MIN} > \Delta_{34MIN}$, and $\Delta_{34MIN} < -0.1$; and the core and the cladding provide a fiber with cable cutoff less than 1500 nm, dispersion D at 1550 nm of $3 \leq D \leq 8$ ps/nm/km, and an effective area at 1550 nm greater than 80 µm² and bend losses less than 1 dB/m when the fiber is wrapped around a mandrel having 15 mm radius.

* * * * *